United States Patent [19]

Lloyd

[11] 4,391,641

[45] Jul. 5, 1983

[54] SINTERED POWDER METAL FRICTION MATERIAL

[75] Inventor: Herbert W. Lloyd, Monsey, N.Y.

[73] Assignee: Abex Corporation, New York, N.Y.

[21] Appl. No.: 318,719

[22] Filed: Nov. 6, 1981

Related U.S. Application Data

[63] Continuation-in-part of Ser. No. 218,316, Dec. 19, 1980, abandoned.

[51] Int. Cl.$^3$ .......................... C08K 3/08; C08K 3/06; C08K 3/04
[52] U.S. Cl. .................................. 106/36; 188/251 M
[58] Field of Search ..................... 106/36; 188/251 M; 428/545, 546

[56] References Cited

U.S. PATENT DOCUMENTS

| | | | |
|---|---|---|---|
| 2,470,269 | 5/1949 | Schaefer | 29/192 |
| 2,863,211 | 12/1958 | Wellmann | 29/182.3 |
| 2,892,707 | 6/1959 | Biggs | 75/208 |
| 2,899,740 | 8/1959 | Cox | 29/182.3 |
| 3,101,527 | 8/1963 | Weinman et al. | 29/182.5 |
| 3,341,931 | 9/1967 | Libbin et al. | 29/420.5 |
| 3,434,998 | 3/1969 | Aldrich et al. | 260/38 |

FOREIGN PATENT DOCUMENTS

| | | |
|---|---|---|
| 567207 | 8/1975 | Switzerland . |
| 818442 | 9/1957 | United Kingdom . |
| 1337002 | 4/1971 | United Kingdom . |

OTHER PUBLICATIONS

Chemical Abstracts, 84:63347y, 1974.
Chemical Abstracts, 88:77239j, 1975.
Chemical Abstracts—73.122931g—Sintered Iron—Graphite Friction Materials—English Abstract.
Chemical Abstracts—73.133454e—Properties & Production of Steel Based Sintered Friction Material—English Abstract.
Chemical Abstracts—83.135543p—Chromium Effect on Structural Transformations... Sintered Materials—English Abstract.

*Primary Examiner*—Lewis T. Jacobs
*Attorney, Agent, or Firm*—David A. Greenlee; Thomas S. Baker, Jr.

[57] ABSTRACT

An iron-base, sintered powder metal friction material suitable for railroad braking is disclosed. The friction material comprises, by volume, 10–70% carbon; 0–2.5% sulfur; 0–10% alumina; 1–45% of a metal powder additive selected from the group consisting of copper, manganese, ferrochrome, chrome carbide compounds and mixtures thereof; and the balance iron. In preferred embodiments, the powder metal additives are 11–25% copper, or 9–15% manganese, or 5–20% ferrochrome.

10 Claims, No Drawings

SINTERED POWDER METAL FRICTION MATERIAL

This is a continuation-in-part of application Ser. No. 218,316, filed Dec. 19, 1980, now abandoned.

BACKGROUND OF THE INVENTION

This invention relates generally to powder metal friction materials, and more particularly to iron-base, sintered powder metal friction material suitable for use as railroad brake shoes. For many years, cast iron has been used as a brake shoe material for tread braking railroad vehicles. In an effort to improve wear life of railroad brake shoes, composition shoes were developed.

With the use of a composition shoe, the coefficient of friction can be tailored to the specific application requirements. However, some composition shoes are subject to wet fade, a condition which causes elongated stopping distances in wet weather. Also, composition shoes have been found to have a very short life when used in high energy braking applications, such as on locomotives, especially switching locomotives.

Another problem associated with composition shoes is that the products of decomposition, or debris, especially graphite, tend to "pollute" the wheel and rails, thus reducing their coefficient of friction.

Another problem with some high friction composition shoes has been their tendency to exhibit metal pickup, a phenomenon wherein slivers of wheel steel are transferred to the composition shoes. The metal on the shoes then causes gouging of the wheels during subsequent braking. Such gouging will cause wheels to quickly go out of tolerance and produce high flanges. These problems require premature wheel replacement and consequently increase costs.

Because of the problems with state-of-the-art railroad brake shoes, it was felt that a new type of railroad brake shoe should be developed. It was thought that a sintered powder metal material might be suitable, since it would probably exhibit very little wet fade.

Sintered powder metal shoes have been developed for use in aircraft disc braking. Although aircraft braking is also high-energy braking, it is otherwise quite different from railroad braking. Aircraft braking is normally disc braking, while railroad braking is usually accomplished by engaging brake shoes with the running surface or tread of the cast steel wheels themselves. Because of this, aircraft friction materials have always been quite different from railroad friction materials. Sintered powder metal friction materials have also been recently introduced into the automotive market as disc pads. Automotive disc brakes are quite different from railroad tread brakes because of the energy levels involved and a single type of friction material is not suitable for both applications.

SUMMARY OF THE INVENTION

It is, therefore, an object of this invention to develop a sintered powder metal friction material suitable for railroad use. Accordingly, such a sintered material comprising powders of iron, carbon and sulfur was formulated and dynamometer tested in accordance with UIC and AAR test procedures. While wear life, coefficient of friction, stop distances and wet fade characteristics were quite good, some of the tests produced metal pickup in the shoes. Accordingly, adjustments were made to the formula by adding and deleting certain ingredients in an effort to eliminate metal pickup.

As a result of extensive testing, it was found that a friction material suitable for railroad braking can be made from a sintered mixture of powders of iron, carbon and a powdered metal additive selected from the group consisting of copper, manganese, ferrochrome and chrome carbide compounds. Sulfur can be added and alumina is added when copper or manganese powders are used. Brake shoes made from these materials exhibit good wear characteristics and little or no metal pickup, as will now be explained.

DETAILED DESCRIPTION OF THE INVENTION

To evaluate these friction materials, two dynamometer test procedures were used, UIC (European) and AAR (USA). The various mixes were formed into actual brake shoes and dynamometer tested against actual cast steel wheels.

The UIC test procedure is as follows:
1. Wear-in: 60 kph stop with 3752 lb. BSL (Brake Shoe Load)
2. Test Stops: From speeds of 160, 120, 100, 90, 60, 50, 40, 30, 15 kph each with 7505, 5628, 3752, 1876 lb. BSL.
3. Drag Tests:
   37 KW load @ 60 kph—20 minutes
   55 KW load @ 60 kph—1 minute The AAR test procedure is as follows:
1. Wear-in: Drag Test—1450 lb. BSL @ 20 mph—45 minutes
2. Test Stops:
   3 stops each from 90, 70, 50, 30, 10 mph with 2000 lb. BSL.
   3 stops each from 90, 70, 50, 30, 10 mph with 6000 lb. BSL.
3. Drag Tests:
   925 lb. BSL @ 20 mph—45 minutes
   1450 lb. BSL @ 20 mph—45 minutes The criteria used to evaluate friction material performance were coefficient of friction, stop distance and wear.

Each mix was preformed cold at 9 TSI, then sintered by heating to 1600°–2000° F. and pressing at 9 TSI. Each mix was put through some or all of the UIC or AAR tests noted above. The process of sintering, as used herein, means shaping and partially fusing by heating below the melting point. This process is also known as solid phase or solid state sintering.

BASE MIX

The first mix tested had the following composition (volume %):

|  | MIX A |
| --- | --- |
| Iron | 50.8 |
| Carbon (graphite) | 46.7 |
| Sulfur | 2.5 |

Coefficient of friction, stop distance and wear rate were quite good. However, in five tests, metal pickup (shoes picking up metal from the wheel) was visually observed in two. The mix was rejected because metal pickup is undesirable, since it causes gouging of the wheel, which will quickly go out of tolerance. It was then decided to try different additive powders in an attempt to eliminate metal pickup.

SULFUR MIXES

It was initially thought that increasing the sulful content might eliminate metal pickup. Two mixes with a high sulfur content were tested; their compositions were (volume %):

|  | MIX B | MIX C |
|---|---|---|
| Iron | 66.0 | 66.0 |
| Carbon (graphite) | 26.5 | 29.0 |
| Sulfur | 7.5 | 5.0 |

In 38 tests, metal pickup was observed in 18; these mixes were rejected.

PHOSPHOROUS MIXES

Two mixes having a purposeful phosphorous (via the use of ferrophosphorous) and aluminum oxide addition were tested. Because of previous tests, sulfur was deleted. Their compositions were (volume %):

|  | MIX D | MIX E |
|---|---|---|
| Iron | 58.4 | 58.0 |
| Carbon (graphite) | 25.8 | 25.5 |
| Ferrophosphorous | .9 | 1.8 |
| Aluminum Oxide | 14.9 | 14.7 |

In 29 tests, metal pickup was noted in 26; these mixes were rejected.

COPPER MIXES

A number of mixes with the addition of copper at 1.4–35% (volume) were tested next. The compositions of exemplary copper-containing mixes tested were (volume %):

|  | MIX F | MIX G | MIX H |
|---|---|---|---|
| Iron | 57.0 | 56.5 | 35.0 |
| Carbon (graphite) | 30.0 | 20.0 | 30.0 |
| Copper | 3.0 | 11.0 | 35.0 |
| Sulfur | — | 2.5 | — |
| Aluminum Oxide | — | 10.0 | — |

Those mixes having less than 4.0% copper evidenced metal pickup in 12 out of 20 tests; those mixes having more than 4.0% copper showed metal pickup in only five out of 96 tests, with no metal pickup evident when the copper content was over 11%. Sulfur did not seem to affect metal pickup in the copper mixes.

MANGANESE MIXES

Several mixes containing manganese as an additive powder were also tested. These mixes had a manganese content of 1.0–37.5% (volume). The compositions of examples of these mixes were (volume %):

|  | MIX I | MIX J | MIX K | MIX L |
|---|---|---|---|---|
| Iron | 52.5 | 45.5 | 37.5 | 50.0 |
| Carbon (graphite) | 30.0 | 30.0 | 20.0 | 35.0 |
| Sulfur | 2.5 | 2.5 | 2.5 | — |
| Manganese | 10.0 | 20.0 | 37.5 | 10.0 |
| Aluminum Oxide | 5.0 | 5.0 | 2.5 | 5.0 |

Metal pickup was evident in seven out of 19 tests with less than 9.0% manganese, but in only one out of 113 tests where the manganese content was 9.0–37.5%. The absence of sulfur in Mix L had no apparent effect.

FERROCHROME MIXES

Several powder metal mixes containing chromium were tested. The chromium was introduced in the form of ferrochrome which consists of about half chrome carbide and about half iron chrome carbide. The ferrochrome additive ranged from 1.0–39.0% (volume). The compositions of some exemplary ferrochrome content mixes were (volume %):

|  | MIX M | MIX N | MIX O |
|---|---|---|---|
| Iron | 59.1 | 50.5 | 38.75 |
| Carbon (graphite) | 30.0 | 30.0 | 20.0 |
| Sulfur | 2.5 | 2.5 | 2.5 |
| Ferrochrome | 8.4 | 17.0 | 38.75 |
|  | MIX P | MIX Q | MIX R |
| Iron | 45 | 25 | 44 |
| Carbon (graphite) | 40 | 70 | 55 |
| Sulfur | — | — | — |
| Ferrochrome | 15 | 5 | 1 |

Many compositions using various proportions of iron, carbon and ferrochrome were made and tested. It was determined that sulfur was not an essential ingredient in preventing metal pickup. In all, 233 tests were conducted with these materials. Metal pickup was evident in only 2 tests. It was then decided to formulate and test a mix using carbon in the form of coke to replace the graphite. The composition was (volume %):

|  | MIX S |
|---|---|
| Iron | 45 |
| Carbon (coke) | 40 |
| Ferrochrome | 15 |

Upon testing, this mix exhibited no metal pickup and performed much as Mix P which included graphite. It was concluded that the cheaper coke could be substituted for graphite.

SUMMARY

The extensive testing conducted on iron-based, sintered powder metal friction materials containing iron and graphite indicated that the purposeful addition of copper, manganese or ferrochrome dramatically reduced or eliminated metal pickup of wheel steel by the friction material during braking. To obtain desired friction levels, it was found desirable to add a friction agent such as aluminum oxide to the mixes containing copper or manganese. Such addition was found unnecessary when ferrochrome was used, probably because of the content of chrome carbides and iron chrome carbides in the ferrochrome. While sulfur was an initial ingredient, it was later found that the absence of sulfur had no visible effect on metal pickup.

It was determined that the metal pickup can be prevented, or reduced, best by using (volume %) 9+% manganese, 4+% copper of 1+% ferrochrome. Preferred ranges were determined to be 9–15% manganese with 2–8% aluminum oxide, 11–25% copper with 5–10% aluminum oxide or 5–20% ferrochrome. It was found that carbon, in the form of graphite or coke, could effectively be used in quantities of 10–70%, the preferred ranges being 30–40% when used with manganese, 15–30% when used with copper and 29–70% when used with ferrochrome.

I claim:

1. An iron-base, sintered powder metal friction material for railroad braking use formed by solid phase sintering and consisting essentially of, by volume, 10–70% carbon in the form of coke or graphite; 0–2.5% sulfur; 0–10% alumina; 9–40% of a metal powder additive selected from the group consisting of copper, manganese, ferrochrome, and chrome carbide compounds; and the balance iron.

2. The iron-base, sintered powder metal friction material of claim 1, wherein the metal powder additive is ferrochrome.

3. The iron-base, sintered powder metal friction material of claim 1, wherein the powder metal additive is a chrome carbide compound.

4. The iron-base, sintered powder metal friction material of claim 1, which has 3–10% alumina and as the powder metal additive, 9–25% manganese.

5. The iron-base, sintered powder metal friction material of claim 1, which has 3–10% alumina and, as the powder metal additive, 9–35% copper.

6. An iron-base, sintered powder metal friction material for railroad braking use formed by solid phase sintering and consisting essentially of, by volume, 30–40% graphite; 0–2.5% sulfur; 2–8% aluminum oxide; 9–15% manganese, and balance iron.

7. An iron-base, sintered powder metal friction material for railroad braking use formed by solid phase sintering and consisting essentially of, by volume, 15–30% graphite; 0–2.5% sulfur; 5–10% aluminum oxide; 4–25% copper, and balance iron.

8. An iron-base, sintered powder metal friction material for railroad braking use formed by solid phase sintering and consisting essentially of, by volume, 20–70% carbon in the form of coke or graphite; 0–2.5% sulfur; 1–20% ferrochrome, and balance iron.

9. The iron-base, sintered powder metal friction material of claim 8, which has 5–20% ferrochrome, 25–45% carbon in the form of graphite and no sulfur.

10. An iron-base, sintered powder metal friction material for railroad braking use formed by solid phase sintering and consisting essentially of, by volume, 30–50% carbon in the form of coke or graphite, 10–20% ferrochrome, and balance iron.

* * * * *